(12) United States Patent
Koyun (10) Patent No.: US 10,449,724 B2
(45) Date of Patent: Oct. 22, 2019

(54) BUTT WELDING MACHINE WITH A CUTTER FOR A PLASTIC PIPE COMPRISING A DRIVE GEAR UNIT

(71) Applicant: Ahmet Koyun, Besiktas/Istanbul (TR)

(72) Inventor: Ahmet Koyun, Besiktas/Istanbul (TR)

(*) Notice: Subject to any disclaimer, the term of this patent is extended or adjusted under 35 U.S.C. 154(b) by 0 days.

(21) Appl. No.: 15/748,190

(22) PCT Filed: Jul. 28, 2016

(86) PCT No.: PCT/TR2016/050244
§ 371 (c)(1),
(2) Date: Jan. 28, 2018

(87) PCT Pub. No.: WO2017/018961
PCT Pub. Date: Feb. 2, 2017

(65) Prior Publication Data
US 2018/0243995 A1 Aug. 30, 2018

(30) Foreign Application Priority Data
Jul. 28, 2015 (TR) .................................. 2015/09330

(51) Int. Cl.
*B29C 65/00* (2006.01)
*B29C 65/20* (2006.01)
(Continued)

(52) U.S. Cl.
CPC ...... *B29C 65/2092* (2013.01); *B29C 65/7841* (2013.01); *B29C 66/02241* (2013.01);
(Continued)

(58) Field of Classification Search
CPC . B29C 65/2092; B29C 65/74; B29C 65/7451; B29C 65/7805; B29C 65/7808;
(Continued)

(56) References Cited

U.S. PATENT DOCUMENTS 3,013,925 A * 12/1961 Larsen ................ B29C 65/7802
156/153
5,241,157 A * 8/1993 Wermelinger ...... B29C 66/1142
156/304.2
(Continued)

FOREIGN PATENT DOCUMENTS

CN      103612384 A       3/2014
DE         2313382 A1 * 10/1973 ......... B29C 65/2092
DE         2313382 A1    10/1973

*Primary Examiner* — Mark A Osele
*Assistant Examiner* — Nickolas R Harm
(74) *Attorney, Agent, or Firm* — Andrew Malarz, Esq.

(57) ABSTRACT

Butt welding machine (2) adjusting the ends of plastic pipes and welding them to each other, which comprises a cutter (1) having a driving element (16) for moving the trimmer (13) by being driven, at least one movable claw (24, 32, 33) moving depending on a connector to hold pipes which are positioned, a motor (21) which does not have direct connection with the cutter (1) and transfers power to the cutter (1) and to the movable claw (24, 32, 33) via one connector for each, a drive gear unit (22) which provides driving energy from one point to the cutter (1) and the movable claw (24, 32, 33) which wherein the cutter (1) and the movable claw (24, 32, 33) needs to be had two different driving motions performed via two different connectors, a drive gear unit (22) providing driving energy to the movable claw (24, 32, 33) from one point.

22 Claims, 7 Drawing Sheets

(51) Int. Cl.
*B29C 65/78* (2006.01)
*B29C 65/74* (2006.01)

(52) U.S. Cl.
CPC ...... *B29C 66/1142* (2013.01); *B29C 66/5221* (2013.01); *B29C 66/73921* (2013.01); *B29C 65/74* (2013.01); *B29C 65/7451* (2013.01); *B29C 65/7805* (2013.01); *B29C 65/7808* (2013.01); *B29C 65/7814* (2013.01); *B29C 65/7861* (2013.01); *B29C 66/52* (2013.01); *Y10T 156/1052* (2015.01); *Y10T 156/1066* (2015.01); *Y10T 156/125* (2015.01)

(58) Field of Classification Search
CPC ............ B29C 65/7814; B29C 65/7841; B29C 65/7861; B29C 66/02241; B29C 66/1142; B29C 66/52; B29C 66/5221; B29C 66/73921; Y10T 156/1052; Y10T 156/1066; Y10T 156/125
USPC .... 156/158, 256, 258, 304.2, 391, 503, 511, 156/517
See application file for complete search history.

(56) References Cited

U.S. PATENT DOCUMENTS

| | | | | |
|---|---|---|---|---|
| 5,814,181 | A * | 9/1998 | Richter | B29C 65/2092 156/158 |
| 6,550,514 | B1 * | 4/2003 | Andrew | B29C 65/2084 156/304.2 |
| 9,023,263 | B2 * | 5/2015 | St. Onge | B29C 66/02245 156/304.2 |

* cited by examiner

SECTION A-A

BUTT WELDING MACHINE WITH A CUTTER FOR A PLASTIC PIPE COMPRISING A DRIVE GEAR UNIT

RELATED TECHNICAL FIELD OF THE INVENTION

This invention is related with a butt welding machine comprising a cutter and a drive gear unit for driving, used for joining plastic pipes by butt welding process.

PRIOR ART

Butt welding machines for plastic pipes developed in order to join plastic pipes to each other are used in industry for a long time. Because of the increase in the need for these machines nowadays, producers of butt welding machines for plastic pipes are working to develop these machines. These machines perform welding process of 2 pipes by positioning 2 pipes butt to butt such that they are equiaxed with the help of their claws, by cutting the butt surfaces of pipes via a cutter, by heating these butt surfaces via a heater and by generating a certain pressure for a certain period of time. The forward-backward motion of the movable claws holding the pipes toward fixed claws is provided generally by driving of the hydraulic unit of the butt welding machine. The unevennesses on the butt surfaces of pipes are removed via the cutter in order to weld pipes to each other. The thermoplastic material on the butt surfaces of pipes is heated via the heater until it becomes semi-fluid and then the heater is removed from the system, pipes are pressed to each other via the motion of the movable claw according to the international standards under a certain pressure for a certain period of time and beading is provided, therefore the welding process is completed. The weld has the same strength with the material.

In the prior embodiments, driving of said movable claws is provided by the hydraulic unit of the butt welding machine and driving of the cutter is provided by a motor or hydromotor mounted on itself. In some machines, only moving (i.e: shaft motion of the movable claws) is provided by using a single motor, however they cannot work the cutter and machine run at the same time synchronously.

BRIEF DESCRIPTION OF THE INVENTION

The aim of the invention is to realize a butt welding machine providing the motions of the cutter and movable claws at the same time synchronously.

A butt welding machine adjusting the ends of plastic pipes and welding them to each other comprising a cutter having a driving element for moving the trimmer by being driven, at least one movable claw moving depending on a connector to hold pipes which are positioned, a motor which does not have direct connection with the cutter and transfers power to the cutter and to the movable claw via one connector for each, the cutter comprising a drive point such as hydraulic or manual drive; characterized by a a drive gear unit providing driving energy to the movable claw from one point and which can work different points synchronously via driving from one point wherein the cutter (1) and the movable claw (24 and/or 32 and/or 33) need two different driving motions performed via two different connector, is defined in the invention.

In an embodiment of the invention which is with two shafts, the butt welding machine comprises a drive gear unit which can provide horizontal motion of the butt welding machine and driving of the cutter via one shaft.

The drive gear unit can perform driving of the cutter via at least two shafts such as an upper bearing shaft and a lower bearing shaft. This embodiment can be applied on the butt welding machines with 2 shafts and 4 shafts.

In an embodiment of the invention, the drive gear unit comprises synchromeshes which enable the cutter and the function of forward-backward motion at the same time or separately.

The cutter moves as much as the thickness of the piece which is cut from plastic pipe butts and therefore it prevents that pipes are compressed.

In the preferred embodiment of the invention, at least one connector is a shaft.

The cutter comprises a cutter driving shaft connecting the drive gear unit with the cutter and transferring the motion energy which it receives from the drive gear unit to the driving disc for driving the cutter.

In addition; the disclosed machine of the invention comprises a drive gear unit adjusting the speed of the motion coming from a hydromotor, pneumatic motor, electric motor or drive unit like manual drive by changing it before the drive gear unit transfers it to the cutter driving shaft.

The butt welding machine comprises an upper driving shaft and a lower driving shaft which connect the movable claws to the drive gear unit and transfer the motion energy which they receive from the drive gear unit to the movable claws for driving the movable claws.

The butt welding machine comprises a drive gear unit adapted for performing linear forward-backward motion of the movable claws at the horizontal axis of the machine and for moving the cutter which is mounted on a different shaft at the same time synchronously.

The butt welding machine comprises a drive gear unit adapted for performing linear forward-backward motion of the movable claws at the horizontal axis of the machine and for moving the cutter which is mounted on a different shaft rotationally at the same time synchronously.

The butt welding machine has a drive gear unit comprising a motor or its gear, a reduction input gear, an output gear without reduction, a reduction output gear wheel, a reduction output gear, a reduction input threaded rod, a reduction input worm, a reduction output worm, a reduction leadscrew threaded rod, a reduction output threaded rod, a movable claw gear shaft, a movable claw gear providing the horizontal motion of the movable claws, a movable claw upper chain wheel, a chain, a chain tightener wheel, a movable claw lower chain transmission gear, a chain transmission gear, a movable claw upper chain wheel, a movable claw lower gear, a cutter drive gear, a cutter gear wheel providing the motion of the cutter, a cutter gear, a movable claw upper gear.

The butt welding machine comprises one or two movable claw gear with a magnetic coil and a cutter gear with a synchromesh, a magnetic coil.

The butt welding machine comprises a reduction system reducing the cycle of movable claw upper and lower driving shafts providing the horizontal motion of the movable claws during the cutting process.

The butt welding machine comprises a drive gear unit having a close protective box and a cap which does not transmit impurities such as dust, soil, water depending on places of its use.

The butt welding machine comprises a drive gear unit providing that the forward motion of the movable claws at the direction of horizontal axis of the machine is towards the fixed claw by being driven via motor.

In an embodiment of the butt welding machine, the motor used is an electric motor.

The butt welding machine comprises a drive gear unit having a cutter gear which is operated as single or dual optionally and movable claw gear; namely, synchromeshes for gear and cycle changes.

The butt welding machine comprises a drive gear unit having a manual, hydraulic, magnetic coiled, mechanic or pneumatic cutter gear optionally and movable claw gear; namely, synchromeshes for gear and cycle changes.

The butt welding machine comprises a cutter having a driving disc comprising gear instead of motor driven mechanism and comprising no motor mounted on itself and adapted such that it is provided that it is driven by the cutter driving shaft.

The butt welding machine comprises a cutter having a driving disc where motion transmission is provided by gear or friction drive.

The butt welding machine comprises cutter driving shaft and movable claws adapted such that they use manual, mechanical, hydraulic or pneumatic energy optionally for providing the forward-backward motion of the cutter driving shaft and movable claws at the horizontal direction of the machine towards the fixed claw.

In addition, the butt welding machine comprises a driving system characterized by comprising the drive gear unit system which is completely servo and compatible with all automation system and comprising synchromesh providing that their synchromeshes make the cutter and the butt welding machine's forward movements at the same time and when there is no cutter, providing that the machine moves only forward-backward automatically.

In an embodiment, the driving system comprises a drive gear unit working with a single synchromesh, not two synchromeshes.

In an embodiment of the butt welding machine comprising two or four shafts, the driving system comprises a single geared cutter. In this embodiment, a single gearwheel directly connected to the shaft drives the cutter.

In the embodiment of the butt welding machine in which butt welding machine comprises two or four shafts, the driving system comprises double geared cutter so one more gear is being comprised between the cutter and the gear connected to the shaft. With this embodiment a better reduction is provided.

Also, the driving system comprises a cutter and shaft having a gear which can perform power transmission and drive by using a rubber or chain.

In the invention, there is not a motor mounted on the cutter. The cutter has a driving disc comprising gear instead of a motor driven mechanism on itself and it is adapted at the machine such that it is provided that it is driven via the cutter driving shaft. Therefore, it has a light structure and can be carried easily.

In the invention due to the driving shaft and geared disc mechanism of the cutter, the pressure applied to the pipe positioned at the machine by the cutter stays constant during the cutting process and the material removal of the cutter is kept at a proper level. Therefore, the chassis of the machine does not have stress formation.

DETAILED DESCRIPTION OF THE INVENTION

DESCRIPTION OF THE REFERENCES IN THE FIGURES

The parts in the attached figures are numbered respectively and the equivalents of these numbers are given below.
2. Butt welding machine
   20. Chassis
   21. Motor
   23. Movable claw upper driving shaft
   24. Movable claw
   25. Upper bearing shaft
   26. Heater
   27. Fixed claw
   28. Side bearing shaft
   29. Cutter driving shaft
   30. Lower bearing shaft
   31. Movable claw lower driving shaft
   32. First holder
   33. Second holder
1. Cutter
   10. Upper bearing
   11. Bearing disc
   12. Knife disc
   13. Trimmer (Knife)
   14. Lower bearing
   15. Lower bearing fixing element
   16. Driving element (driving disc)
   17. Ball
22. Drive gear unit
   221. Motor gear
   231. Reduction input gear
   241. Output gear without reduction
   251. Reduction output gear wheel
   261. Reduction output wheel
   271. Reduction input threaded rod
   281. Reduction input worm
   291. Reduction output worm
   301. Reduction leadscrew threaded rod
   311. Reduction output threaded rod
   321. Movable claw gear shaft 331. Movable claw gear
341. Movable claw upper chain wheel
351. Chain
361. Chain tightener wheel
371. Movable claw lower chain transmission wheel
381. Chain transmission wheel
391. Movable claw lower chain wheel
401. Movable claw lower wheel
411. Cutter drive wheel
421. Cutter gear wheel
431. Cutter gear
441. Movable claw upper wheel The disclosed butt welding machine (2) of the invention comprises a chassis (20) which is at the lower side of the machine (2) and provides support to the machine (2), a motor (21) providing driving of the machine (2) and a drive gear unit (22) transferring power from the motor (21), an upper driving shaft (23), a movable claw (24), an upper bearing shaft (25), a heater (26), a fixed claw (27), a side bearing shaft (28), a cutter driving shaft (29), a lower bearing shaft (30) and a lower driving shaft (31) and two movable holder (32 or 33).

The disclosed butt welding machine (2) of the invention also comprises a cutter (1). The cutter (1) comprises an upper fixed bearing (10), a bearing disc (11), a knife disc (12), at least one trimmer (13), a lower fixed bearing (14), a lower bearing fixing element (15), a driving element (16) such as driving disc (16) and preferably balls (17).

The cutter (1) can be driven from the lower bearing shaft (30) or upper bearing shaft (25) or both of them (25 and 30). Therefore, a second reduction is formed at the cutter (1). For this reason, feed rate of the machine (2) and rotational speed of the cutter (1) can be adjusted as required.

Another embodiment of the disclosed butt welding machine (2) of the invention comprises a chassis (20) which is at the lower side of the butt welding machine (2) and provides support to the machine (2) and a motor (21) providing driving the machine (2) and a drive gear unit (22) transferring power from the motor (21), an upper bearing shaft (25) providing driving and bearing together, a lower bearing shaft (30) providing driving and bearing together, holder or holders (32 and/or 33), movable claw or claws (24).

An embodiment with two shafts of the disclosed butt welding machine (2) of the invention comprises a single geared, double geared or three geared cutter (1) which can be driven only from the lower bearing shaft (30), the upper bearing shaft (25) or from both of them (25 and 30).

The drive gear unit (22) comprises a motor gear (221), a reduction input gear (231), an output gear without reduction (241), a reduction output gear wheel (251), a reduction output wheel (261), a reduction input threaded rod (271), a reduction input worm (281), a reduction output worm (291), a reduction leadscrew threaded rod (301), a reduction output threaded rod (311), a movable claw gear shaft (321), a movable claw gear (331), a movable claw upper chain wheel (341), a chain (351), a chain tightener wheel (361), a movable claw lower chain transmission wheel (371), a chain transmission wheel (381), a movable claw lower chain wheel (391), a movable claw lower wheel (401), a cutter drive wheel (411), a cutter gear wheel (421), a cutter gear (431), a movable claw upper wheel (441).

The trimmer (13) is a knife in the preferred embodiment of the invention.

The driving disc (16) has a structure which allows to be moved via a shaft.

The holders (32, 33) are positioned such that there are one for each two sides of the cutter (1) for fixing the ends of pipes which are at the cutter (1) side. The first and second holders (32, 33) are movable claws.

At the machine (2); the fixed claw (27), first holder (32), heater (26), cutter (2), second holder (33), movable claw (24) are positioned from left to right respectively. All of these elements (27, 32, 26, 2, 33, 24) are in circular form (e.g. disc) and their connections are made to the related shafts (23, 25, 28, 29, 30, 31) in order that they are driven.

A first plastic pipe is passed through the fixed claw (27) and first holder (32) and it is provided that it reaches to the heater (26) and/or cutter (2). At the opposite direction; a second plastic pipe is passed through the movable claw (24) and second holder (33) and it is provided that it reaches to the heater (26) and/or cutter (2).

The fixed claw (27), the heater (26), the cutter (2), the movable claw (24) and holders (32, 33) are attached to the upper bearing shaft (25) from one end of each and to the lower bearing shaft (30) from another end of each.

In addition, the cutter (1) is connected with the cutter driving shaft (29).

In the invention, the motor (21) is positioned at the machine (2) without direct physical contact with the cutter (1) for driving the cutter (2). The connection of the cutter (1) and motor (21) is made via a connector such as a shaft.

In all embodiments of the butt welding machine (2), said cutter (1) can be driven from only one shaft or both lower and upper bearing shafts (25, 30) via two gears by providing better reduction due to a single gear connected to the shaft and a gear positioned between the cutter (1) and a gear connected to the shaft.

Figure 1:
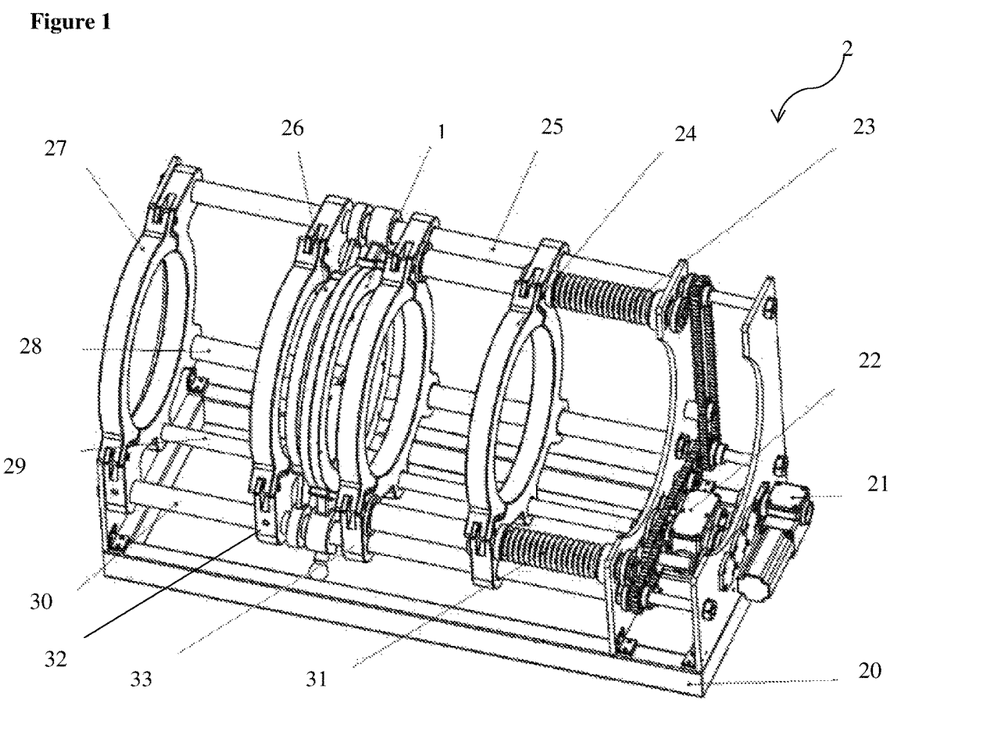
FIG. 1: It is the perspective view of the disclosed butt welding machine of the invention.

In FIG. 1, the general perspective view of the butt welding machine (2) for plastic pipes which joins the plastic pipes by butt welding method. The elements of the butt welding machine (2) for plastic pipes are mounted to the chassis (20). The motor (21) (electric motor in this embodiment) provides the drive mechanism of the machine (2) together with the drive gear unit (22). This mechanism (21, 22) drives the lower and upper driving shafts (31, 23) of the machine (2). The movable claw (24) holding one of two plastic pipes makes axial movement on the upper, side and lower bearing shafts (25, 28, 30) due to these driving shafts (31, 23) and therefore, it gets the pipes near to each other. It provides that pipes are pressed to each other by providing necessary pressure for beading. The fixed claw (27) holding the second pipe is fixed by the upper, side and lower bearing shafts (25, 28, 30). Also, the cutter (1) is fixed to the upper, side and lower bearing shafts (25, 28, 30) like the movable and fixed claws (24, 27) in the butt welding process. Because there is not any motor or reducer on the cutter (1) for driving, the cutter (1) is driven by the cutter driving shaft (29) which is driven via the drive gear unit (22) and main electric motor (21) of the butt welding machine (2). After the cutting process is finished, the cutter (1) is removed from the system and the heater (26) is added to the system instead of it. The heating process is continued under a certain pressure and time, the heater (26) is removed from the system when desired parameters are provided, beading is provided by pressing the pipes to each other under a certain pressure by the movable claw (24) and the welding process is performed in accordance with the international standards.

In the invention: the motor (21) can be hydraulic, pneumatic and triggering can be provided also via other driving mechanisms like manual instead of the motor (21).

Figure 2:
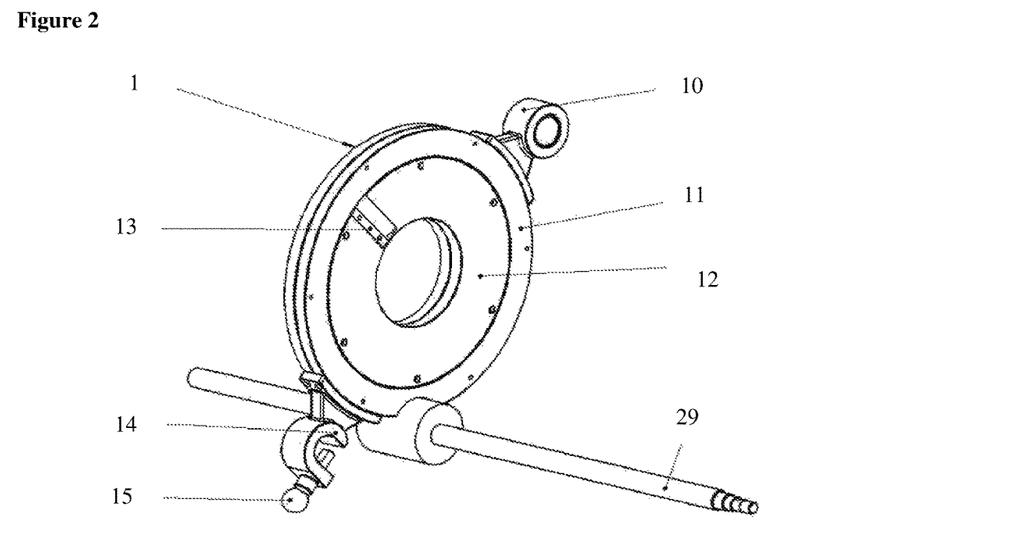
FIG. 2: It is the perspective view of the cutter and cutter driving shaft of the butt welding machine.

In FIG. 2, the cutter (1) is shown in detail. The upper cutter bearing (10) on the cutter (1) is beared to the upper bearing shaft (25) of the welding machine (2). This cutter bearing (10) provides that the cutter (1) turns around the upper bearing shaft (25). The cutter bearing disc (11) performs bearing for the cutter knife disc (12). The knives (13) on the cutter knife disc (12) perform the cutting process of the butts of pipes. The lower bearing (14) of the cutter (1) is attached to the lower bearing fixing element (15) of the welding machine (2) such as a pin (15) and it is locked. This lower cutter bearing (14) and pin (15) provide that the cutter (1) stays fixed during the cutting process and that the pipe butt surfaces form properly.

Figure 3:
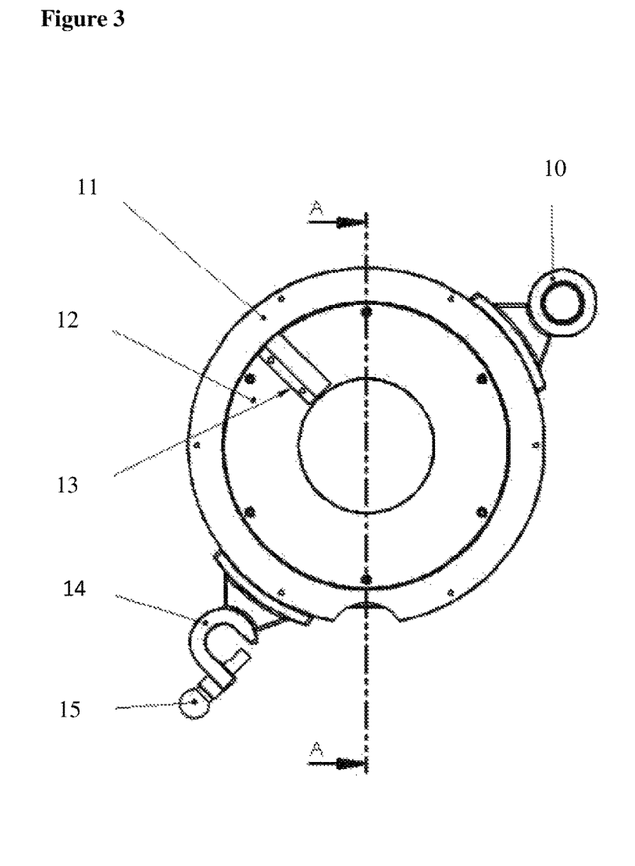
FIG. 3: It is the view of the cutter of the butt welding machine from an angle.
Figure 4:
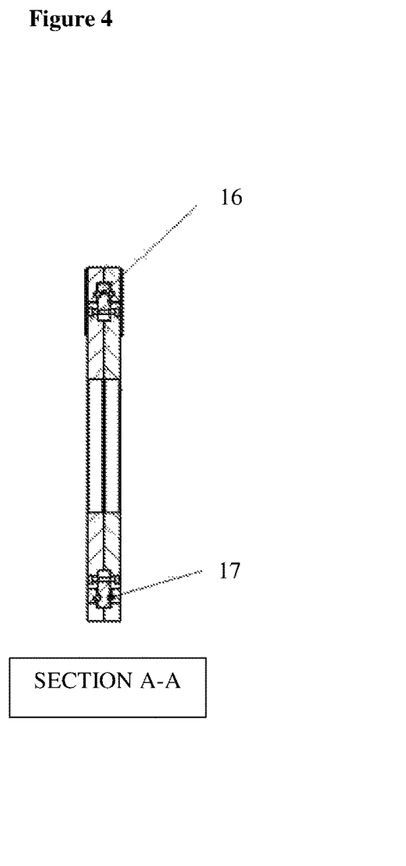
FIG. 4: It is the view of the section A-A of the cutter of the butt welding machine in the FIG. 3.
Figure 5:
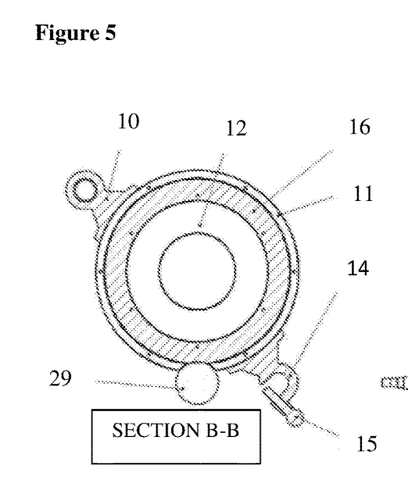
FIG. 5: It is the view of the cutter of the butt welding machine from another angle.
Figure 6:
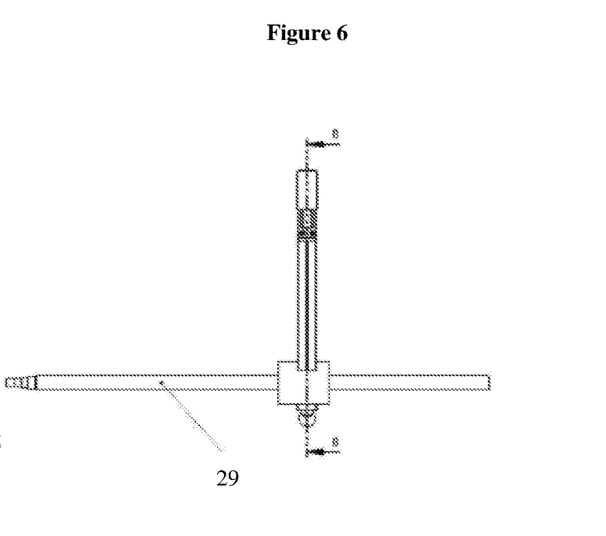
FIG. 6: It is the view of the section B-B of the cutter of the butt welding machine in the FIG. 5.
Figure 7:
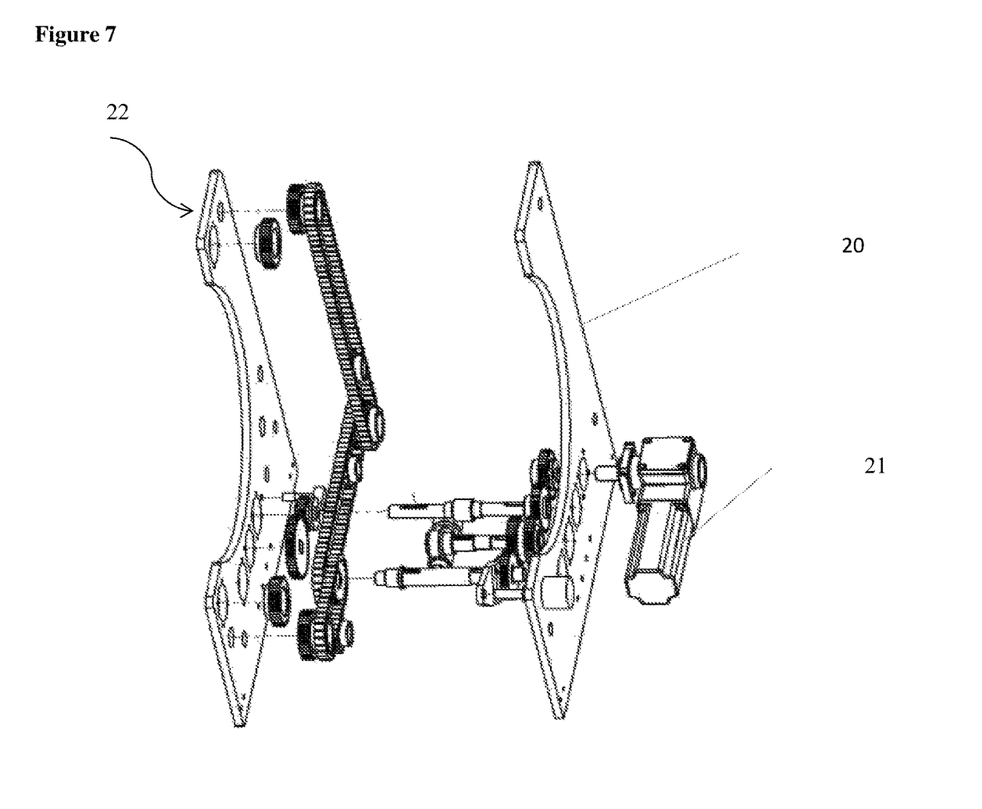
FIG. 7: It is the exploded view of the drive gear unit of the disclosed butt welding machine of the invention.

In the FIG. 3, the sectional view of the cutter (1) is shown. Gear and/or friction driving disc (16) is driven by the cutter driving shaft (29) and the balls (17) are used around this disc (16) in order that it rotates easily in this embodiment and this disc (16) performs the cutting process by rotating the cutter knife disc (12) to which it is connected or a cutter, which can be rotated from bottom or side shaft with a single driving shaft or with a transfer system, is used.

Figure 8:
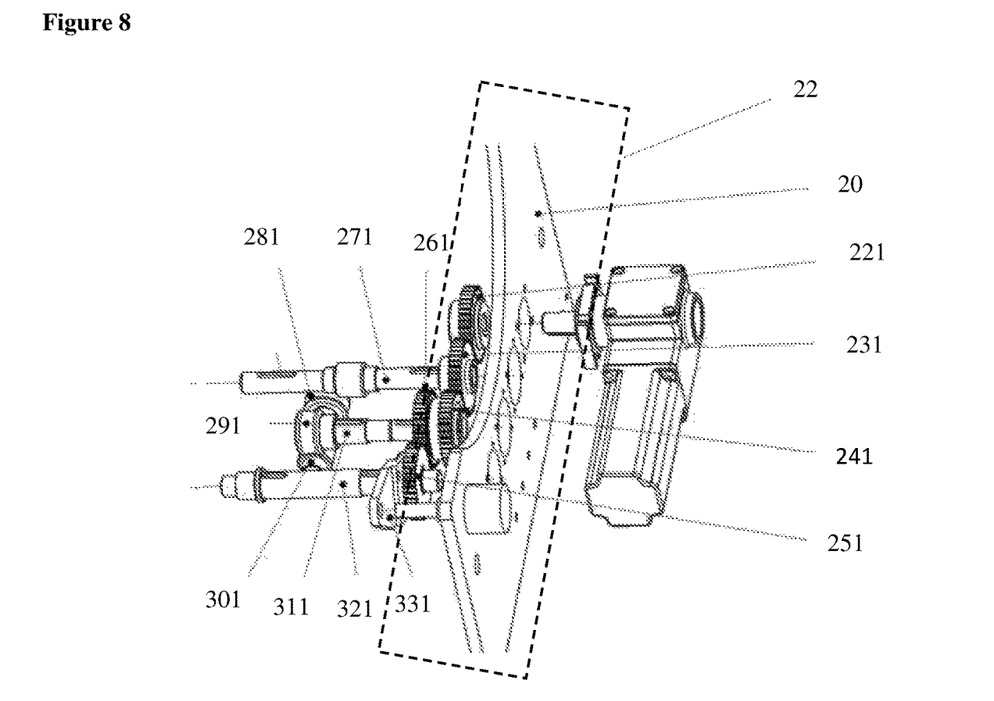
FIG. 8: It is the exploded view of the drive gear unit of the disclosed butt welding machine of the invention from another angle (from the right side of the machine according to the FIG. 1).

In the FIG. 8, the moving claw gear and cutter gear (331, 431) are shown while the cutter (1) is not working.

Figure 9:
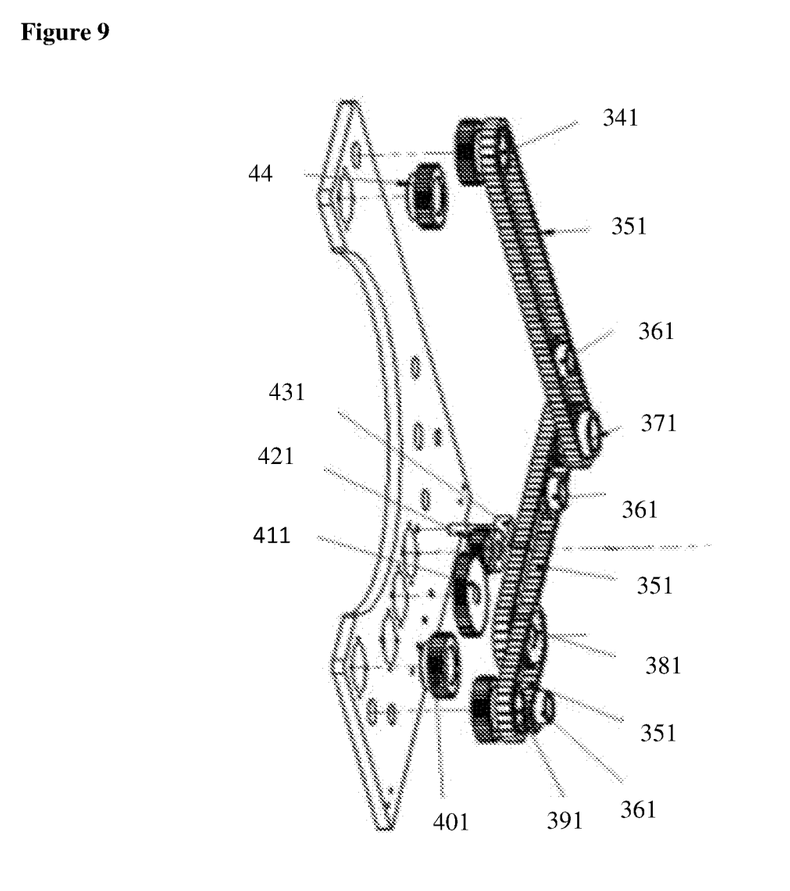
FIG. 9: It is the view of the drive gear unit of the disclosed butt welding machine of the invention from another view (from the left side of the machine according to the FIG. 1).
Figure 10:
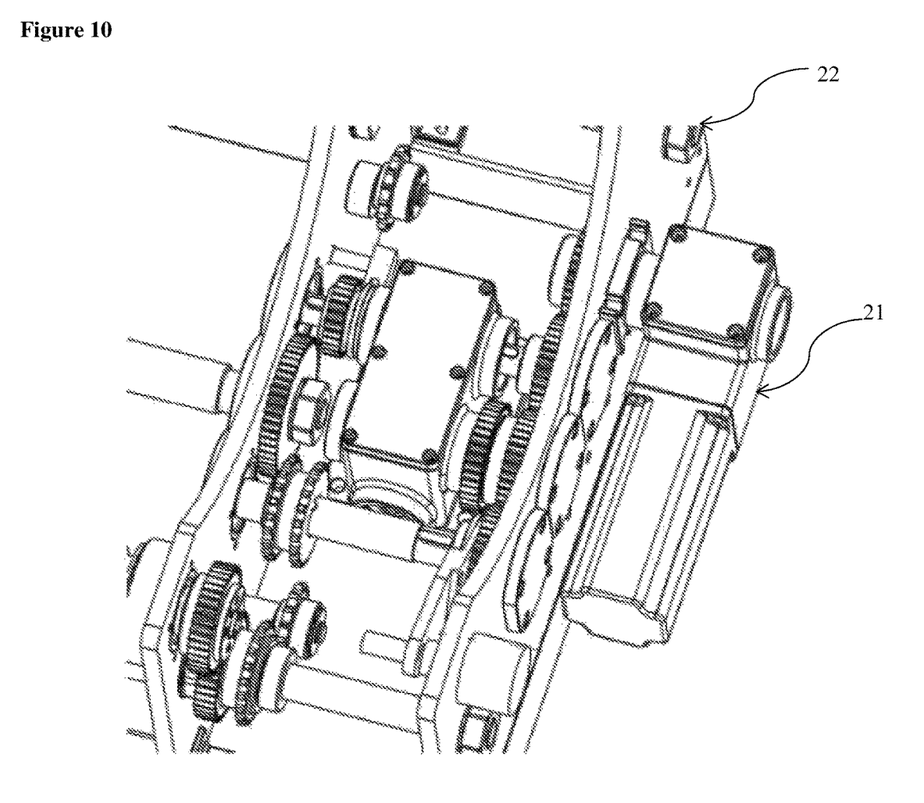
FIG. 10: It is the perspective view of the drive gear unit showing the conditions of the gears while the cutter of the disclosed butt welding machine of the invention is not working.
Figure 11:
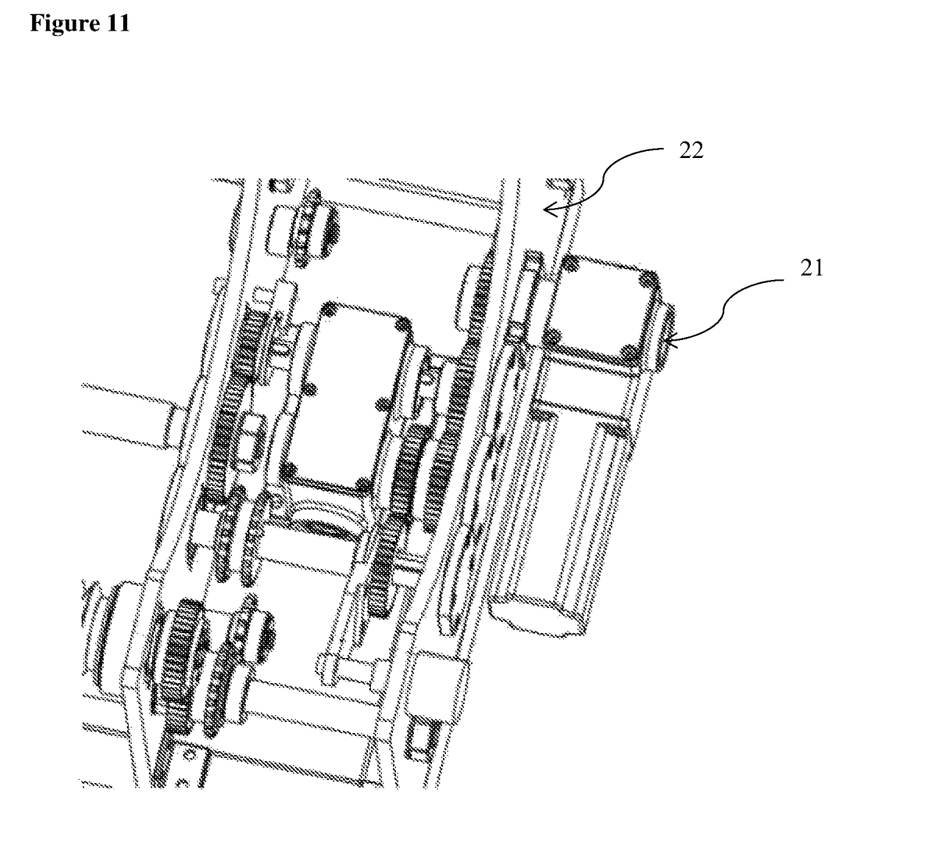
FIG. 11: It is the perspective view of the drive gear unit showing the conditions of the gears while the cutter of the disclosed butt welding machine of the invention is working.

In the FIG. 9, the moving claw gear and cutter gear (331, 431) are shown while the cutter (1) is working.

The drive transmission line is different while the cutter (1) is working and while the cutter (1) is not working. While the cutter (1) is not working, the motor gear (221) is rotated by being driven from the motor (21). The motor gear (221) rotates the reduction input gear (231), the reduction input gear (231) rotates the output gear without reduction (241). Therefore, the output gear without reduction (241) drives reduction output gear wheel (251). This wheel (251) drives the chain transmission wheel (381) by rotating the movable claw gear shaft (321) which it is connected to and it activates the chain system. The chains (351) are tightened by the chain tightener wheels (361) and it provides that the chains (351) fits to the chain wheels (341, 371, 381, 391) completely. The chain transmission wheel (381) drives the movable claw lower and upper wheels (401, 441) by rotating the movable claw upper chain wheel (341) and movable claw lower chain wheel (391) via movable claw upper chain transmission wheel (371) and provides that the movable claws (24) are moved at the direction of the horizontal axis of the machine (2).

While the cutter (1) is working, the motor gear (221) is rotated by being driven from the motor (21). The motor gear (221) drives the reduction input gear (231) and the reduction input threaded rod (271) connected to it. This rod (271) drives the reduction input worm (281) which it works together with and therefore, the reduction leadscrew threaded rod (301) which this worm (281) works together with is rotated. This rod (301) drives the reduction output worm (291) and therefore, the reduction output threaded rod (311) is rotated. This rod (311) rotates reduction output gear wheel (251) by driving the reduction output wheel (261) which it works together with. This wheel (251) activates the chain system by rotating the movable claw gear shaft (321) which it is connected to, driving the chain transmission wheel (381). The chain transmission wheel (381) drives the movable claw lower and upper wheels (401, 441) by rotating the movable claw upper chain wheel (341) and the lower chain wheels (391) via the movable claw upper chain transmission wheel (371) and provides that the movable claws (24) are moved at the horizontal direction.

The drive gear unit (22) is driven from the motor (21) which it is connected to. For the welding process, firstly the pipes are positioned at the movable and fixed claws (24, 32, 33, 27) and bolted and fixed to these claws (24, 32, 33, 27). After this process, the movable claws (24, 32, 33) are moved forward-backward at the horizontal direction by being driven from the drive gear unit (22) system. In this process, only the movable claws (24, 32, 33) are driven. The movable claw gear (331) is driven directly from the motor (21) without reduction by working at position A shown in the FIG. 8 to provide high speed. The pipes are separated from each other until the area required for mounting the cutter (1) to the welding machine (2) is provided.

After the cutter (1) is included into the system, the cutter gear (431) provides that the cutter driving shaft (29) is driven by the drive gear unit (22) by reaching to position B' shown in the FIG. 9 and this shaft (29) starts the cutting process by driving the cutter (1). Before the cutting process starts, the movable claw gear (331) starts to be driven by the reducer, which reduces the speed, via reaching to position A' shown in the FIG. 9. Because it is required that the movable claws (24, 32, 33) provides contact of the cutter knives (13) with the pipe butt surfaces in the cutting process, they should move towards the fixed claw (27) in the amount of cutting. However, this movement during the cutting process must be much slower than the free motion of the movable claws (24, 32, 33) at the horizontal direction during the times when there is no cutting process. That's why, usage of a reducer reducing the speed of the movable claw (24, 32, 33) is required during the cutting process. Therefore, the speed of the cutter driving shaft (29) is higher than the speed of the movable claw upper and lower driving shafts (23, 31) in the cutting process. When the cutting process finishes, the cutter gear (431) removes the drive coming to the cutter driving shaft (29) by reaching to position B in the FIG. 8, the movable claw gear (331) starts to be driven directly from the motor (21) by reaching to position A again and therefore it provides that the movable claw upper and lower driving shafts (23, 31) rotate with high speed. After the cutter (1) is removed from the system, the heater (26) is included to the system. The contact of the pipes to the butt surfaces is provided due to the forward-backward motion of the movable claws (24, 32, 33). After the heating process applied according to the parameters of pressure and time determined via international standards, the heater (26) is removed from the system and the pipes are pressed to each other by the movable claws (24, 32, 33) with a certain pressure and time until the desired beading thickness is formed and the welding process of the pipes is completed.

According to the embodiments of the invention, a synchromesh gear transmission rod used for gear and speed changes in the drive gear unit (22) may be manual, hydraulic, magnetic coiled, mechanical or pneumatic geared. The cutter and movable claw changing rod, namely; the synchromeshes are worked as single or double.

The disclosed system of this patent application has one main motor (21) instead of drive mechanism of the cutter and machine (2) feeding drive mechanism and this motor (21) provides driving to the cutter (1) and motion of the movable claw (24) from one point. This motor (21) and drive gear unit (22) system meet the driving need in this two different points having separate moment and torque. Therefore; need for the hydraulic unit and cutter motor (21) is removed, the butt welding machine (2) for plastic pipes is lightened.

In the disclosed butt welding machine (2) of the invention, one or two motor drives can be used. (Also; hydraulic, pneumatic, manual drives can be used.)

The pressing process of pipes to each other can be driven via a forward-backward motor (21) manually or mechanically and also it can be performed as hydraulic or pneumatic.

However, the aim is not only to provide the forward-backward motion of the machine (2) via the motor (21) in this invention developed depending on driving with motor (21). The disclosed mechanism of this patent application provides the forward-backward motion of the machine (2) (shafts in the machine) and also drives the cutter which is the subject matter of our patent application in Turkey with the same application date with this application and with the title of "BUTT WELDING MACHINE COMPRISING A CUTTER FOR A PLASTIC PIPE" depending on this forward-backward speed synchronously. Therefore, it is not necessary that the motor (21), reducer or hydromotor are placed into the cutter and an additional driving system is also not necessary. Driving the machine (2) with the servo motor controls the cutting speed of the cutter synchronously depending on the feed rate of the machine (2). The drive gear unit (22) drives the cutter with the desired cycle ratio synchronously whatever speed the servo has. In the disclosed system of this application, the speed of this servo is adjusted due to the drive gear unit (22), not adjusted via driver. This system can be realized not only with the servo motor but also with a normal asynchronous motor. This system provides a more advantageous usage than the machines where hydraulic, pneumatic linear motion are provided. The cutter that is subject matter of our patent application with the title of "BUTT WELDING MACHINE COMPRISING A CUTTER FOR A PLASTIC PIPE" can be used in all forward-backward driving systems and a driving form having the most efficacious and the highest usage advantage is produced in case of providing forward-backward motion via the usage of the invention disclosed in this application. The cutter in our patent application with the title of "BUTT WELDING MACHINE COMPRISING A CUTTER FOR A PLASTIC PIPE" is developed together with the driving system with geared mechanism disclosed in this invention and provides the generation of the most appropriate and efficient butt welding machine (2) for plastic pipes. Two patent applications filed on the same day can work together compatibly and this increases the importance of said patent application.

In addition; if a machine whose linear motion is provided hydraulically or pneumatically (or other driving systems may be added) and if the cutter in the patent application which we develop with the title of "BUTT WELDING MACHINE COMPRISING A CUTTER FOR A PLASTIC PIPE" is used, this cutter can be driven by 3 different driving solutions. Going forward-backward of the machine and the rotation of the cutter can be realized from this single driving point in the system in case of the drive provided as hydraulic, pneumatic and manual. For driving "the geared driving disc" of a new type cutter which is the subject matter in the patent application with the title of "BUTT WELDING MACHINE COMPRISING A CUTTER FOR A PLASTIC PIPE", a motor working hydraulically (hydromotor) or pneumatically (pneumotor) which has a proper gear on itself for the driving gear of the cutter can be used. If the machine (2) performs its linear motion with any of motors mechanically, the cutter may be driven on a suitable location of the machine (2), with a separate motor having a gear on it. In this situation, the gear changing synchromeshes are not required.

The invention is not limited with the disclosed embodiments above, a skilled person in the art can produce different embodiments of the invention easily. They should be evaluated within the scope of invention protection demanded with claims.

INDUSTRIAL APPLICABILITY OF THE INVENTION

The drive gear unit (22) of the butt welding machine (2) for plastic pipes producing solutions for the technical problems described above successfully, providing one driving center for driving of the movable claws and cutter which are two different driving point and working with the main motor (21), providing that the butt welding machine (2) for plastic pipes is a single body and is carried easily can be produced.

The invention claimed is:

1. A butt welding machine (2) adjusting the ends of plastic pipes and welding them to each other comprising a cutter (1) having a driving element (16) for moving a trimmer (13) by being driven, also comprising at least one movable claw (24, 32, 33) to hold pipes which will be positioned, wherein the at least one movable claw (24, 32, 33) is attached to an upper bearing shaft (25) from one end of each and to a lower bearing shaft (30) from another end of each and also attached to a side bearing shaft (28) from another end of each, for bearing the at least one movable claw (24, 32, 33) for making axial movement, the butt welding machine (2) is characterized by a motor (21) which does not have direct connection with the cutter (1) and transfers power to the cutter (1) and to the at least one movable claw (24 and/or 32 and/or 33) via at least one driving shaft (23, 29, 31), the butt welding machine (2) also characterized by a drive gear unit (22) which provides energy to the at least one movable claw (24 and/or 32 and/or 33) and cutter (1) so which drives different driving shafts (23, 29, 31) of the at least one movable claw (24 and/or 32 and/or 33) and the cutter (1) synchronously wherein the cutter (1) and the at least one movable claw (24 and/or 32 and/or 33) need two different driving motions, wherein the cutter (1) is connected to a cutter driving shaft (29) for connecting the cutter (1) with the drive gear unit (22) and so transmitting a motion energy which it receives from the drive gear unit (22) to the driving element (16) for driving the cutter (1) rotationally, and wherein the at least one movable claw (24 32, 33) is attached to a lower driving shaft (31) and an upper driving shaft (23) connecting the at least one movable claw (24, 32, 33) with the drive gear unit (22) and transmitting a motion energy that it receives from the drive gear unit (22) to the at least one movable claw (24, 32, 33) driving the at least one movable claw (24, 32, 33) for moving at a direction of the horizontal axis of the machine (2), wherein all driving shafts (23, 29, 31) are connected from one of their ends to the drive gear unit (22) for transmitting motion energy.

2. The butt welding machine (2) according to claim 1 characterized by comprising the cutter (1) which has no motor mounted on itself and has a driving element (16) comprising a driving disc and a gear on itself and is adapted such that it is driven via the cutter driving shaft (29).

3. The butt welding machine (2) according to claim 2 characterized by the drive gear unit (22) comprising synchromeshes which operates the cutter (1) rotationally, and the at least one movable claw (24, 32, 33) with a forward-backward motion (2), at the same time or separately via gear changing.

4. The butt welding machine (2) according to claim 3 characterized by the drive gear unit (22) adjusting a motion coming from a driving unit by changing its speed before it transmits the motion to the cutter driving shaft (29).

5. The butt welding machine (2) according to claim 4 characterized by comprising one or two magnetic coiled movable claw gear (331) and magnetic coiled cutter gear (431) with synchromesh.

6. The butt welding machine (2) according to claim 5 characterized by the drive gear unit (22) having a manual, hydraulic, magnetic coiled, mechanic or pneumatic cutter B gear (431) and movable claw gear (331); for gear joints and cycle changes.

7. The butt welding machine (2) according to claim 5 wherein movable claw gear (331) is a synchromesh.

8. The butt welding machine (2) according to claim 3 characterized by the drive gear unit (22) adapted for the at least one movable claw (24, 32, 33) linearly forward-backward at the horizontal axis of the machine (2) and for moving the cutter (1) attached at a different shaft at the same time synchronously.

9. The butt welding machine (2) according to claim 8 characterized by the drive gear unit (22) that provides the forward motion of the at least one movable claw (24, 32, 33) towards a fixed claw (27) at the direction of horizontal axis of the machine (2) via being driven by the motor (21).

10. The butt welding machine (2) according to claim 3 characterized by the drive gear unit (22) adapted for moving the at least one movable claw (24, 32, 33) forward-backward linearly at the horizontal axis of the machine (2) and for moving the cutter (1) attached at a different shaft rotationally at the same time synchronously.

11. The butt welding machine (2) according to claim 10 wherein the motor (21) is an electric motor.

12. The butt welding machine (2) according to claim 11 having a driving system comprising the drive gear unit system (22) which is completely servo and compatible with all automation system and comprising synchromesh providing that the cutter (1) and the machine (2) moves forward at the same time and when there is no cutter (1), the machine (2) move only forward-backward automatically.

13. The butt welding machine (2) according to claim 10 characterized by the cutter driving shaft (29) and the at least one movable claw (24, 32, 33) adapted such that they use manual, mechanical, hydraulic or pneumatic energy for providing the forward-backward motion of the cutter driving shaft (29) and movable claws (24, 32, 33) at the horizontal direction of the machine (2) towards the fixed claw (27).

14. The butt welding machine (2) according to claim 1 wherein the driving element (16) is a driving disc (16).

15. The butt welding machine (2) according to claim 14 characterized by the drive gear unit (22) comprising a motor (21) or its gear (221), a reduction input gear (231), an output gear without reduction (241), a reduction output gear wheel (251), a reduction output wheel (261), a reduction input threaded rod (271), a reduction input worm (281), a reduction output worm (291), a reduction leadscrew threaded rod (301), a reduction output threaded rod (311), a movable claw gear shaft (321), a movable claw gear (331) providing the motion of the movable claws (24, 32, 33) at the horizontal direction, a movable claw upper chain wheel (341), a chain (351), a chain tightener wheel (361), a movable claw lower chain transmission wheel (371), a chain transmission wheel (381), a movable claw lower chain wheel (391), a movable claw lower wheel (401), a cutter drive wheel (411), a cutter gear wheel (421) providing the motion of cutter (1), a cutter gear (431), a movable claw upper wheel (441).

16. The butt welding machine (2) according to claim 15 characterized by the drive gear unit (22) having a cutter gear (431) which is operated as single or dual and movable claw gear (331) for gear joints and cycle changes.

17. The butt welding machine (2) according to claim 16 characterized by comprising the driving system having the drive gear unit (22) such that it works with one synchromesh not with two synchromeshes.

18. The butt welding machine (2) according to claim 16 comprising the driving system having one geared cutter (1) for the machine (2) with two shafts or 4 shafts.

19. The butt welding machine (2) according to claim 18 having the driving system comprising double geared cutter (1) which comprises one more gear between the cutter (1) and gear connected to the shaft, for the machine (2) with two shafts or 4 shafts.

20. The butt welding machine (2) according to claim 18 having the driving system comprising the cutter (1) and shaft having a gear which can perform power transmission and drive by using a rubber or chain (351).

21. The butt welding machine (2) according to claim 1 characterized by comprising a reduction system which reduces the speed of the movable claw upper and lower driving shafts (23, 31) providing the motion of the at least one movable claw (24, 32, 33) at the horizontal direction during the cutting process.

22. The butt welding machine (2) according to claim 1 characterized by the cutter (1) having the driving element (16) to which motion transmission is provided by gear or friction drive.

* * * * *